United States Patent
Bhandary

(10) Patent No.: US 9,851,943 B2
(45) Date of Patent: Dec. 26, 2017

(54) METHOD AND SYSTEM FOR NUMBER COMPARISON DURING STREAM PROCESSING

(71) Applicant: AVANSEUS HOLDINGS PTE. LTD., Singapore (SG)

(72) Inventor: Chiranjib Bhandary, Bangalore (IN)

(73) Assignee: Avanseus Holdings Pte. Ltd., Singapore (SG)

( * ) Notice: Subject to any disclaimer, the term of this patent is extended or adjusted under 35 U.S.C. 154(b) by 65 days.

(21) Appl. No.: 15/150,470

(22) Filed: May 10, 2016

(65) Prior Publication Data

US 2017/0255448 A1    Sep. 7, 2017

(51) Int. Cl.
G06F 7/00    (2006.01)
G06F 7/02    (2006.01)
G06F 5/01    (2006.01)

(52) U.S. Cl.
CPC . G06F 7/02 (2013.01); G06F 5/01 (2013.01)

(58) Field of Classification Search
CPC .................................. G06F 7/02; G06F 5/01
USPC .............................. 708/209, 671; 340/146.2
See application file for complete search history.

(56) References Cited

U.S. PATENT DOCUMENTS 5,682,158 A * 10/1997 Edberg ................ G06F 3/00
                                                  341/106
2013/0028334 A1 * 1/2013 Bossen ............. H03M 7/4018
                                                  375/240.25

* cited by examiner

Primary Examiner — Tan V. Mai
(74) Attorney, Agent, or Firm — Renner, Otto, Boisselle & Sklar, LLP

(57) ABSTRACT

Embodiments of the invention provide a method and system for comparing a given number and a target number. The method comprises: generating a current index associated with the given number based on a current digit pair including a first current digit from the given number and a second current digit from the target number, and a current state information associated with the given number; looking up the generated current index in a preset state transition table to identify a next state information, wherein the preset state transition table maintains a plurality of mappings, each mapping is between an index and a next state information; if the current digit pair includes a last digit of any of the two numbers, determining a final comparison result based on the next state information; otherwise, taking on the next state information as the current state information for comparison of a next digit pair.

23 Claims, 28 Drawing Sheets

| Review token | State |
|---|---|
| Before seeing any pair | The current state is "initial" state. |
| After seeing (1,1) | Input number is "possibly equal" to target number, then the current state is changed to "possibly equal". |
| After seeing (2,4) | Since the current state is "possibly equal" state, it is inferred that the next state should be "possibly greater" state. It is still not sure since the input number still may be lengthwise smaller than the target number. |
| After seeing (3,3) | Since the current state is "possibly greater" state, it is inferred that the next state remains in the same state. |
| After seeing (4,9) | Since the current state is "possibly greater" state and so far that same number of digits have been encountered in both numbers, it is inferred that the next state remains in the same state. |
| On encountering end of strings on both numbers | A final comparison result is formed based on the "possibly greater" state. The final comparison result is "greater" state, meaning that the input number 1439 is greater than the target number 1234. |

Figure 2

| Review token | State |
|---|---|
| Before seeing any pair | The current state is "initial" state. |
| After seeing (0,1) | Since the current state is "initial" state and "0" is encountered in one of the two numbers, this "0" digit will be skipped and stay in "initial" state. The pointer of input number will be moved back on digit, i.e. instead of moving to digit "2" in input number, the next digit will be (1,1). For target number, one digit is moved as usual and consider "1" as the next digit. |
| After seeing (1,1) | The current state moves to "possibly equal" state. |
| After seeing (2,2) | The current state remains in "possibly equal" state. |
| After seeing (3,3) | The current state remains in "possibly equal" state. |
| After seeing (4,5) | The current state remains in "possibly greater" state. |
| On encountering end of strings on both numbers | The current state moves to "greater" state, meaning that input number 1235 is greater than target number 01234. |

Figure 3

| Review token | State |
|---|---|
| Before seeing any pair | The current state is "initial" state. |
| After seeing (1,1) | The current state moves to "possibly equal" state. |
| After seeing (2,2) | The current state remains in "possibly equal" state. |
| After seeing (3,.(dot)) | The final comparison result is "smaller" state since a decimal point is encountered in input number while a normal digit is encountered in target number. The comparison may be stopped at this stage. However, the comparison process may proceed to traverse rest of the digits in both the numbers to ensure that these indeed are valid numbers, meaning that these do not contain any character other than 0-9, dot (.) etc. |

Figure 4

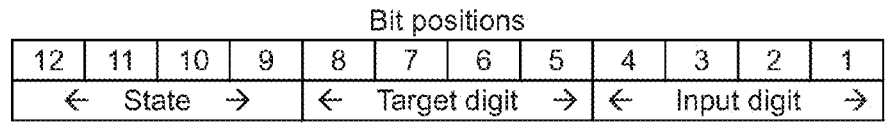

| Bit positions | | | | | | | | | | | |
|---|---|---|---|---|---|---|---|---|---|---|---|
| 12 | 11 | 10 | 9 | 8 | 7 | 6 | 5 | 4 | 3 | 2 | 1 |
| ← State → | | | | ← Target digit → | | | | ← Input digit → | | | |

Figure 6

| State | State type | Encoded value |
|---|---|---|
| Initial | Initial | 0 |
| Possibly greater | Intermediate | 1 |
| Possibly smaller | Intermediate | 2 |
| Possibly equal | Intermediate | 3 |
| Possibly equal with decimal place indicator | Intermediate | 7 |
| Greater | Final | 4 |
| Smaller | Final | 5 |
| Equal | Final | 6 |

Figure 7

| Digit | Encoded value (4 bits) |
|---|---|
| 0 | 0x00 |
| 1 | 0x01 |
| 2 | 0x02 |
| 3 | 0x03 |
| 4 | 0x04 |
| 5 | 0x05 |
| 6 | 0x06 |
| 7 | 0x07 |
| 8 | 0x08 |
| 9 | 0x09 |
| Decimal place indicator/Decimal point (dot) | 0x0A |
| Unused | 0x0B |
| Unused | 0x0C |
| Unused | 0x0D |
| Thousand separator | 0x0E |
| Space character | 0x0F |

Figure 8

Bit positions

| 8 | 7 | 6 | 5 | 4 | 3 | 2 | 1 |
|---|---|---|---|---|---|---|---|
| Move indicator for target number | Move indicator for input number | Unused | Unused | ← | | State | → |

Figure 9

| Index | Result byte | Index | Result byte | Index | Result byte |
|---|---|---|---|---|---|
| 0x000 | 0x00 | 0x001 | 0x01 | 0x002 | 0x01 |
| 0x003 | 0x01 | 0x004 | 0x01 | 0x005 | 0x01 |
| 0x006 | 0x01 | 0x007 | 0x01 | 0x008 | 0x01 |
| 0x009 | 0x01 | | | | |
| | | | | | |
| 0x010 | 0x80 | 0x011 | 0x03 | 0x012 | 0x01 |
| 0x013 | 0x01 | 0x014 | 0x01 | 0x015 | 0x01 |
| 0x016 | 0x01 | 0x017 | 0x01 | 0x018 | 0x01 |
| 0x019 | 0x01 | | | | |
| | | | | | |
| 0x020 | 0x80 | 0x021 | 0x02 | 0x022 | 0x03 |
| 0x023 | 0x01 | 0x024 | 0x01 | 0x025 | 0x01 |
| 0x026 | 0x01 | 0x027 | 0x01 | 0x028 | 0x01 |
| 0x029 | 0x01 | | | | |
| | | | | | |
| 0x030 | 0x80 | 0x031 | 0x02 | 0x032 | 0x02 |

Figure 10

| Index | Result byte | Index | Result byte | Index | Result byte |
|---|---|---|---|---|---|
| 0x033 | 0x03 | 0x034 | 0x01 | 0x035 | 0x01 |
| 0x036 | 0x01 | 0x037 | 0x01 | 0x038 | 0x01 |
| 0x039 | 0x01 | | | | |
| | | | | | |
| 0x040 | 0x80 | 0x041 | 0x02 | 0x042 | 0x02 |
| 0x043 | 0x02 | 0x044 | 0x03 | 0x045 | 0x01 |
| 0x046 | 0x01 | 0x047 | 0x01 | 0x048 | 0x01 |
| 0x049 | 0x01 | | | | |
| | | | | | |
| 0x050 | 0x80 | 0x051 | 0x02 | 0x052 | 0x02 |
| 0x053 | 0x02 | 0x054 | 0x02 | 0x055 | 0x3 |
| 0x056 | 0x01 | 0x057 | 0x01 | 0x058 | 0x01 |
| 0x059 | 0x01 | | | | |
| | | | | | |
| 0x060 | 0x80 | 0x061 | 0x02 | 0x062 | 0x02 |
| 0x063 | 0x02 | 0x064 | 0x02 | 0x065 | 0x02 |
| 0x066 | 0x03 | 0x067 | 0x01 | 0x068 | 0x01 |
| 0x069 | 0x01 | | | | |
| | | | | | |
| 0x070 | 0x80 | 0x071 | 0x02 | 0x072 | 0x02 |
| 0x073 | 0x02 | 0x074 | 0x02 | 0x075 | 0x02 |
| 0x076 | 0x02 | 0x077 | 0x03 | 0x078 | 0x01 |
| 0x079 | 0x01 | | | | |
| | | | | | |
| 0x080 | 0x80 | 0x081 | 0x02 | 0x082 | 0x02 |
| 0x083 | 0x02 | 0x084 | 0x02 | 0x085 | 0x02 |
| 0x086 | 0x02 | 0x087 | 0x02 | 0x088 | 0x03 |
| 0x089 | 0x01 | | | | |
| | | | | | |
| 0x090 | 0x80 | 0x091 | 0x02 | 0x092 | 0x02 |
| 0x093 | 0x02 | 0x094 | 0x02 | 0x095 | 0x02 |
| 0x096 | 0x02 | 0x097 | 0x02 | 0x098 | 0x02 |
| 0x099 | 0x03 | | | | |
| | | | | | |
| 0x0F0 | 0x80 | 0x0F1 | 0x04 | 0x0F2 | 0x04 |
| 0x0F3 | 0x04 | 0x0F4 | 0x04 | 0x0F5 | 0x04 |
| 0x0F6 | 0x04 | 0x0F7 | 0x04 | 0x0F8 | 0x04 |
| 0x0F9 | 0x04 | | | | |

Figure 10 *(continued)*

| Index | Result byte | Index | Result byte | Index | Result byte |
|---|---|---|---|---|---|
| 0x00F | 0x40 | 0x01F | 0x05 | 0x02F | 0x05 |
| 0x03F | 0x05 | 0x04F | 0x05 | 0x05F | 0x05 |
| 0x06F | 0x05 | 0x07F | 0x05 | 0x08F | 0x05 |
| 0x09F | 0x05 | | | | |
| | | | | | |
| 0x0FF | 0x06 | | | | |
| | | | | | |
| 0x300 | 0x03 | 0x301 | 0x01 | 0x302 | 0x01 |
| 0x303 | 0x01 | 0x304 | 0x01 | 0x305 | 0x01 |
| 0x306 | 0x01 | 0x307 | 0x01 | 0x308 | 0x01 |
| 0x309 | 0x01 | | | | |
| 0x310 | 0x02 | 0x311 | 0x03 | 0x312 | 0x01 |
| 0x313 | 0x01 | 0x314 | 0x01 | 0x315 | 0x01 |
| 0x316 | 0x01 | 0x317 | 0x01 | 0x318 | 0x01 |
| 0x319 | 0x01 | | | | |
| | | | | | |
| 0x320 | 0x02 | 0x321 | 0x02 | 0x322 | 0x03 |
| 0x323 | 0x01 | 0x324 | 0x01 | 0x325 | 0x01 |
| 0x326 | 0x01 | 0x327 | 0x01 | 0x328 | 0x01 |
| 0x329 | 0x01 | | | | |
| | | | | | |
| 0x330 | 0x02 | 0x331 | 0x02 | 0x332 | 0x02 |
| 0x333 | 0x03 | 0x334 | 0x01 | 0x335 | 0x01 |
| 0x336 | 0x01 | 0x337 | 0x01 | 0x338 | 0x01 |
| 0x339 | 0x01 | | | | |
| | | | | | |
| 0x340 | 0x02 | 0x341 | 0x02 | 0x342 | 0x02 |
| 0x343 | 0x02 | 0x344 | 0x03 | 0x345 | 0x01 |
| 0x346 | 0x01 | 0x347 | 0x01 | 0x348 | 0x01 |
| 0x349 | 0x01 | | | | |
| | | | | | |
| 0x350 | 0x02 | 0x351 | 0x02 | 0x352 | 0x02 |
| 0x353 | 0x02 | 0x354 | 0x02 | 0x355 | 0x03 |
| 0x356 | 0x01 | 0x357 | 0x01 | 0x358 | 0x01 |
| 0x359 | 0x01 | | | | |
| | | | | | |
| 0x360 | 0x02 | 0x361 | 0x02 | 0x362 | 0x02 |
| 0x363 | 0x02 | 0x364 | 0x02 | 0x365 | 0x02 |
| 0x366 | 0x03 | 0x367 | 0x01 | 0x368 | 0x01 |
| 0x369 | 0x01 | | | | |

Figure 10 *(continued)*

| Index | Result byte | Index | Result byte | Index | Result byte |
|---|---|---|---|---|---|
| 0x370 | 0x02 | 0x371 | 0x02 | 0x372 | 0x02 |
| 0x373 | 0x02 | 0x374 | 0x02 | 0x375 | 0x02 |
| 0x376 | 0x02 | 0x377 | 0x03 | 0x378 | 0x01 |
| 0x379 | 0x01 | | | | |
| 0x380 | 0x02 | 0x381 | 0x02 | 0x382 | 0x02 |
| 0x383 | 0x02 | 0x384 | 0x02 | 0x385 | 0x02 |
| 0x386 | 0x02 | 0x387 | 0x02 | 0x388 | 0x03 |
| 0x389 | 0x01 | | | | |
| | | | | | |
| 0x390 | 0x02 | 0x391 | 0x02 | 0x392 | 0x02 |
| 0x393 | 0x02 | 0x394 | 0x02 | 0x395 | 0x02 |
| 0x396 | 0x02 | 0x397 | 0x02 | 0x398 | 0x02 |
| 0x399 | 0x03 | | | | |
| | | | | | |
| 0x3F0 | 0x04 | 0x3F1 | 0x04 | 0x3F2 | 0x04 |
| 0x3F3 | 0x04 | 0x3F4 | 0x04 | 0x3F5 | 0x04 |
| 0x3F6 | 0x04 | 0x3F7 | 0x04 | 0x3F8 | 0x04 |
| 0x3F9 | 0x04 | | | | |
| 0x30F | 0x05 | 0x31F | 0x05 | 0x32F | 0x05 |
| 0x33F | 0x05 | 0x34F | 0x05 | 0x35F | 0x05 |
| 0x36F | 0x05 | 0x37F | 0x05 | 0x38F | 0x05 |
| 0x39F | 0x05 | | | | |
| | | | | | |
| 0x3FF | 0x06 | | | | |
| | | | | | |
| 0x30E | 0x83 | 0x31E | 0x83 | 0x32E | 0x83 |
| 0x33E | 0x83 | 0x34E | 0x83 | 0x35E | 0x83 |
| 0x36E | 0x83 | 0x37E | 0x83 | 0x38E | 0x83 |
| 0x39E | 0x83 | 0x3FE | 0x83 | | |
| | | | | | |
| 0x3E0 | 0x43 | 0x3E1 | 0x43 | 0x3E2 | 0x43 |
| 0x3E3 | 0x43 | 0x3E4 | 0x43 | 0x3E5 | 0x43 |
| 0x3E6 | 0x43 | 0x3E7 | 0x43 | 0x3E8 | 0x43 |
| 0x3E9 | 0x43 | 0x3EF | 0x43 | | |
| | | | | | |
| 0x3A0 | 0x04 | 0x3A1 | 0x04 | 0x3A2 | 0x04 |
| 0x3A3 | 0x04 | 0x3A4 | 0x04 | 0x3A5 | 0x04 |
| 0x3A6 | 0x04 | 0x3A7 | 0x04 | 0x3A8 | 0x04 |
| 0x3A9 | 0x04 | | | | |

Figure 10 *(continued)*

| Index  | Result byte | Index  | Result byte | Index  | Result byte |
|--------|-------------|--------|-------------|--------|-------------|
| 0x30A  | 0x05        | 0x31A  | 0x05        | 0x32A  | 0x05        |
| 0x33A  | 0x05        | 0x34A  | 0x05        | 0x35A  | 0x05        |
| 0x36A  | 0x05        | 0x37A  | 0x05        | 0x38A  | 0x05        |
| 0x39A  | 0x05        |        |             |        |             |
|        |             |        |             |        |             |
| 0x3AF  | 0x47        | 0x3FA  | 0x87        | 0x3AA  | 7           |
|        |             |        |             |        |             |
| 0x100  | 0x01        | 0x101  | 0x01        | 0x102  | 0x01        |
| 0x103  | 0x01        | 0x104  | 0x01        | 0x105  | 0x01        |
| 0x106  | 0x01        | 0x107  | 0x01        | 0x108  | 0x01        |
| 0x109  | 0x01        |        |             |        |             |
|        |             |        |             |        |             |
| 0x110  | 0x01        | 0x111  | 0x01        | 0x112  | 0x01        |
| 0x113  | 0x01        | 0x114  | 0x01        | 0x115  | 0x01        |
| 0x116  | 0x01        | 0x117  | 0x01        | 0x118  | 0x01        |
| 0x119  | 0x01        |        |             |        |             |
|        |             |        |             |        |             |
| 0x120  | 0x01        | 0x121  | 0x01        | 0x122  | 0x01        |
| 0x123  | 0x01        | 0x124  | 0x01        | 0x125  | 0x01        |
| 0x126  | 0x01        | 0x127  | 0x01        | 0x128  | 0x01        |
| 0x129  | 0x01        |        |             |        |             |
|        |             |        |             |        |             |
| 0x130  | 0x01        | 0x131  | 0x01        | 0x132  | 0x01        |
| 0x133  | 0x01        | 0x134  | 0x01        | 0x135  | 0x01        |
| 0x136  | 0x01        | 0x137  | 0x01        | 0x138  | 0x01        |
| 0x139  | 0x01        |        |             |        |             |
| 0x140  | 0x01        | 0x141  | 0x01        | 0x142  | 0x01        |
| 0x143  | 0x01        | 0x144  | 0x01        | 0x145  | 0x01        |
| 0x146  | 0x01        | 0x147  | 0x01        | 0x148  | 0x01        |
| 0x149  | 0x01        |        |             |        |             |
|        |             |        |             |        |             |
| 0x150  | 0x01        | 0x151  | 0x01        | 0x152  | 0x01        |
| 0x153  | 0x01        | 0x154  | 0x01        | 0x155  | 0x01        |
| 0x156  | 0x01        | 0x157  | 0x01        | 0x158  | 0x01        |
| 0x159  | 0x01        |        |             |        |             |
|        |             |        |             |        |             |
| 0x160  | 0x01        | 0x161  | 0x01        | 0x162  | 0x01        |
| 0x163  | 0x01        | 0x164  | 0x01        | 0x165  | 0x01        |
| 0x166  | 0x01        | 0x167  | 0x01        | 0x168  | 0x01        |
| 0x169  | 0x01        |        |             |        |             |
|        |             |        |             |        |             |
| 0x170  | 0x01        | 0x171  | 0x01        | 0x172  | 0x01        |
| 0x173  | 0x01        | 0x174  | 0x01        | 0x175  | 0x01        |
| 0x176  | 0x01        | 0x177  | 0x01        | 0x178  | 0x01        |
| 0x179  | 0x01        |        |             |        |             |

Figure 10 *(continued)*

| Index | Result byte | Index | Result byte | Index | Result byte |
|---|---|---|---|---|---|
| 0x180 | 0x01 | 0x181 | 0x01 | 0x182 | 0x01 |
| 0x183 | 0x01 | 0x184 | 0x01 | 0x185 | 0x01 |
| 0x186 | 0x01 | 0x187 | 0x01 | 0x188 | 0x01 |
| 0x189 | 0x01 | | | | |
| | | | | | |
| 0x190 | 0x01 | 0x191 | 0x01 | 0x192 | 0x01 |
| 0x193 | 0x01 | 0x194 | 0x01 | 0x195 | 0x01 |
| 0x196 | 0x01 | 0x197 | 0x01 | 0x198 | 0x01 |
| 0x199 | 0x01 | | | | |
| | | | | | |
| 0x1F0 | 0x04 | 0x1F1 | 0x04 | 0x1F2 | 0x04 |
| 0x1F3 | 0x04 | 0x1F4 | 0x04 | 0x1F5 | 0x04 |
| 0x1F6 | 0x04 | 0x1F7 | 0x04 | 0x1F8 | 0x04 |
| 0x1F9 | 0x04 | | | | |
| | | | | | |
| 0x10F | 0x05 | 0x11F | 0x05 | 0x12F | 0x05 |
| 0x13F | 0x05 | 0x14F | 0x05 | 0x15F | 0x05 |
| 0x16F | 0x05 | 0x17F | 0x05 | 0x18F | 0x05 |
| 0x19F | 0x05 | | | | |
| | | | | | |
| 0x1FF | 4 | | | | |
| | | | | | |
| 0x10E | 0x81 | 0x11E | 0x81 | 0x12E | 0x81 |
| 0x13E | 0x81 | 0x14E | 0x81 | 0x15E | 0x81 |
| 0x16E | 0x81 | 0x17E | 0x81 | 0x18E | 0x81 |
| 0x19E | 0x81 | 0x1FE | 0x81 | | |
| | | | | | |
| 0x1E0 | 0x41 | 0x1E1 | 0x41 | 0x1E2 | 0x41 |
| 0x1E3 | 0x41 | 0x1E4 | 0x41 | 0x1E5 | 0x41 |
| 0x1E6 | 0x41 | 0x1E7 | 0x41 | 0x1E8 | 0x41 |
| 0x1E9 | 0x41 | 0x1EF | 0x41 | | |
| 0x1A0 | 0x04 | 0x1A1 | 0x04 | 0x1A2 | 0x04 |
| 0x1A3 | 0x04 | 0x1A4 | 0x04 | 0x1A5 | 0x04 |
| 0x1A6 | 0x04 | 0x1A7 | 0x04 | 0x1A8 | 0x04 |
| 0x1A9 | 0x04 | | | | |
| | | | | | |
| 0x10A | 0x05 | 0x11A | 0x05 | 0x12A | 0x05 |
| 0x13A | 0x05 | 0x14A | 0x05 | 0x15A | 0x05 |
| 0x16A | 0x05 | 0x17A | 0x05 | 0x18A | 0x05 |
| 0x19A | 0x05 | | | | |
| | | | | | |
| 0x1AA | 0x04 | 0x1AF | 0x04 | 0x1FA | 0x04 |

Figure 10 *(continued)*

| Index | Result byte | Index | Result byte | Index | Result byte |
|---|---|---|---|---|---|
| 0x200 | 0x02 | 0x201 | 0x02 | 0x202 | 0x02 |
| 0x203 | 0x02 | 0x204 | 0x02 | 0x205 | 0x02 |
| 0x206 | 0x02 | 0x207 | 0x02 | 0x208 | 0x02 |
| 0x209 | 0x02 | | | | |
| | | | | | |
| 0x210 | 0x02 | 0x211 | 0x02 | 0x212 | 0x02 |
| 0x213 | 0x02 | 0x214 | 0x02 | 0x215 | 0x02 |
| 0x216 | 0x02 | 0x217 | 0x02 | 0x218 | 0x02 |
| 0x219 | 0x02 | | | | |
| | | | | | |
| 0x220 | 0x02 | 0x221 | 0x02 | 0x222 | 0x02 |
| 0x223 | 0x02 | 0x224 | 0x02 | 0x225 | 0x02 |
| 0x226 | 0x02 | 0x227 | 0x02 | 0x228 | 0x02 |
| 0x229 | 0x02 | | | | |
| | | | | | |
| 0x230 | 0x02 | 0x231 | 0x02 | 0x232 | 0x02 |
| 0x233 | 0x02 | 0x234 | 0x02 | 0x235 | 0x02 |
| 0x236 | 0x02 | 0x237 | 0x02 | 0x238 | 0x02 |
| 0x239 | 0x02 | | | | |
| | | | | | |
| 0x240 | 0x02 | 0x241 | 0x02 | 0x242 | 0x02 |
| 0x243 | 0x02 | 0x244 | 0x02 | 0x245 | 0x02 |
| 0x246 | 0x02 | 0x247 | 0x02 | 0x248 | 0x02 |
| 0x249 | 0x02 | | | | |
| | | | | | |
| 0x250 | 0x02 | 0x251 | 0x02 | 0x252 | 0x02 |
| 0x253 | 0x02 | 0x254 | 0x02 | 0x255 | 0x02 |
| 0x256 | 0x02 | 0x257 | 0x02 | 0x258 | 0x02 |
| 0x259 | 0x02 | | | | |
| | | | | | |
| 0x260 | 0x02 | 0x261 | 0x02 | 0x262 | 0x02 |
| 0x263 | 0x02 | 0x264 | 0x02 | 0x265 | 0x02 |
| 0x266 | 0x02 | 0x267 | 0x02 | 0x268 | 0x02 |
| 0x269 | 0x02 | | | | |
| | | | | | |
| 0x270 | 0x02 | 0x271 | 0x02 | 0x272 | 0x02 |
| 0x273 | 0x02 | 0x274 | 0x02 | 0x275 | 0x02 |
| 0x276 | 0x02 | 0x277 | 0x02 | 0x278 | 0x02 |
| 0x279 | 0x02 | | | | |
| 0x280 | 0x02 | 0x281 | 0x02 | 0x282 | 0x02 |
| 0x283 | 0x02 | 0x284 | 0x02 | 0x285 | 0x02 |
| 0x286 | 0x02 | 0x287 | 0x02 | 0x288 | 0x02 |
| 0x289 | 0x02 | | | | |
| | | | | | |

Figure 10 *(continued)*

| Index | Result byte | Index | Result byte | Index | Result byte |
|---|---|---|---|---|---|
| 0x290 | 0x02 | 0x291 | 0x02 | 0x292 | 0x02 |
| 0x293 | 0x02 | 0x294 | 0x02 | 0x295 | 0x02 |
| 0x296 | 0x02 | 0x297 | 0x02 | 0x298 | 0x02 |
| 0x299 | 0x02 | | | | |
| | | | | | |
| 0x2F0 | 0x04 | 0x2F1 | 0x04 | 0x2F2 | 0x04 |
| 0x2F3 | 0x04 | 0x2F4 | 0x04 | 0x2F5 | 0x04 |
| 0x2F6 | 0x04 | 0x2F7 | 0x04 | 0x2F8 | 0x04 |
| 0x2F9 | 0x04 | | | | |
| | | | | | |
| 0x20F | 0x05 | 0x21F | 0x05 | 0x22F | 0x05 |
| 0x23F | 0x05 | 0x24F | 0x05 | 0x25F | 0x05 |
| 0x26F | 0x05 | 0x27F | 0x05 | 0x28F | 0x05 |
| 0x29F | 0x05 | | | | |
| | | | | | |
| 0x2FF | 0x05 | | | | |
| | | | | | |
| 0x20E | 0x82 | 0x21E | 0x82 | 0x22E | 0x82 |
| 0x23E | 0x82 | 0x24E | 0x82 | 0x25E | 0x82 |
| 0x26E | 0x82 | 0x27E | 0x82 | 0x28E | 0x82 |
| 0x29E | 0x82 | 0x2FE | 0x82 | | |
| | | | | | |
| 0x2E0 | 0x42 | 0x2E1 | 0x42 | 0x2E2 | 0x42 |
| 0x2E3 | 0x42 | 0x2E4 | 0x42 | 0x2E5 | 0x42 |
| 0x2E6 | 0x42 | 0x2E7 | 0x42 | 0x2E8 | 0x42 |
| 0x2E9 | 0x42 | 0x2EF | 0x42 | | |
| | | | | | |
| 0x2A0 | 0x04 | 0x2A1 | 0x04 | 0x2A2 | 0x04 |
| 0x2A3 | 0x04 | 0x2A4 | 0x04 | 0x2A5 | 0x04 |
| 0x2A6 | 0x04 | 0x2A7 | 0x04 | 0x2A8 | 0x04 |
| 0x2A9 | 0x04 | | | | |
| | | | | | |
| 0x20A | 0x05 | 0x21A | 0x05 | 0x22A | 0x05 |
| 0x23A | 0x05 | 0x24A | 0x05 | 0x25A | 0x05 |
| 0x26A | 0x05 | 0x27A | 0x05 | 0x28A | 0x05 |
| 0x29A | 0x05 | | | | |
| | | | | | |
| 0x2AA | 0x05 | 0x2AF | 0x05 | 0x2FA | 0x05 |
| | | | | | |
| 0x700 | 0x07 | 0x701 | 0x04 | 0x702 | 0x04 |
| 0x703 | 0x04 | 0x704 | 0x04 | 0x705 | 0x04 |
| 0x706 | 0x04 | 0x707 | 0x04 | 0x708 | 0x04 |
| 0x709 | 0x04 | | | | |

Figure 10 *(continued)*

| Index  | Result byte | Index  | Result byte | Index  | Result byte |
|--------|-------------|--------|-------------|--------|-------------|
| 0x710  | 0x05        | 0x711  | 0x07        | 0x712  | 0x04        |
| 0x713  | 0x04        | 0x714  | 0x04        | 0x715  | 0x04        |
| 0x716  | 0x04        | 0x717  | 0x04        | 0x718  | 0x04        |
| 0x719  | 0x04        |        |             |        |             |
|        |             |        |             |        |             |
| 0x720  | 0x05        | 0x721  | 0x05        | 0x722  | 0x07        |
| 0x723  | 0x04        | 0x724  | 0x04        | 0x725  | 0x04        |
| 0x726  | 0x04        | 0x727  | 0x04        | 0x728  | 0x04        |
| 0x729  | 0x04        |        |             |        |             |
|        |             |        |             |        |             |
| 0x730  | 0x05        | 0x731  | 0x05        | 0x732  | 0x05        |
| 0x733  | 0x07        | 0x734  | 0x04        | 0x735  | 0x04        |
| 0x736  | 0x04        | 0x737  | 0x04        | 0x738  | 0x04        |
| 0x739  | 0x04        |        |             |        |             |
|        |             |        |             |        |             |
| 0x740  | 0x05        | 0x741  | 0x05        | 0x742  | 0x05        |
| 0x743  | 0x05        | 0x744  | 0x07        | 0x745  | 0x04        |
| 0x746  | 0x04        | 0x747  | 0x04        | 0x748  | 0x04        |
| 0x749  | 0x04        |        |             |        |             |
|        |             |        |             |        |             |
| 0x750  | 0x05        | 0x751  | 0x05        | 0x752  | 0x05        |
| 0x753  | 0x05        | 0x754  | 0x05        | 0x755  | 0x07        |
| 0x756  | 0x04        | 0x757  | 0x04        | 0x758  | 0x04        |
| 0x759  | 0x04        |        |             |        |             |
|        |             |        |             |        |             |
| 0x760  | 0x05        | 0x761  | 0x05        | 0x762  | 0x05        |
| 0x763  | 0x05        | 0x764  | 0x05        | 0x765  | 0x05        |
| 0x766  | 0x07        | 0x767  | 0x04        | 0x768  | 0x04        |
| 0x769  | 0x04        |        |             |        |             |
|        |             |        |             |        |             |
| 0x770  | 0x05        | 0x771  | 0x05        | 0x772  | 0x05        |
| 0x773  | 0x05        | 0x774  | 0x05        | 0x775  | 0x05        |
| 0x776  | 0x05        | 0x777  | 0x07        | 0x778  | 0x04        |
| 0x779  | 0x04        |        |             |        |             |
|        |             |        |             |        |             |
| 0x780  | 0x05        | 0x781  | 0x05        | 0x782  | 0x05        |
| 0x783  | 0x05        | 0x784  | 0x05        | 0x785  | 0x05        |
| 0x786  | 0x05        | 0x787  | 0x05        | 0x788  | 0x07        |
| 0x789  | 0x04        |        |             |        |             |

Figure 10 *(continued)*

| Index | Result byte | Index | Result byte | Index | Result byte |
|---|---|---|---|---|---|
| 0x790 | 0x05 | 0x791 | 0x05 | 0x792 | 0x05 |
| 0x793 | 0x05 | 0x794 | 0x05 | 0x795 | 0x05 |
| 0x796 | 0x05 | 0x797 | 0x05 | 0x798 | 0x05 |
| 0x799 | 0x07 | | | | |
| | | | | | |
| 0x7F0 | 0x06 | 0x7F1 | 0x04 | 0x7F2 | 0x04 |
| 0x7F3 | 0x04 | 0x7F4 | 0x04 | 0x7F5 | 0x04 |
| 0x7F6 | 0x04 | 0x7F7 | 0x04 | 0x7F8 | 0x04 |
| 0x7F9 | 0x04 | | | | |
| | | | | | |
| 0x70F | 0x06 | 0x71F | 0x05 | 0x72F | 0x05 |
| 0x73F | 0x05 | 0x74F | 0x05 | 0x75F | 0x05 |
| 0x76F | 0x05 | 0x77F | 0x05 | 0x78F | 0x05 |
| 0x79F | 0x05 | | | | |
| | | | | | |
| 0x7FF | 0x06 | | | | |

Figure 10 *(continued)*

| Sl. No. | Handling any number of leading zeroes | | | | |
|---|---|---|---|---|---|
| | Current state | Digit in target number | Digit in input number | Next state | Action |
| 1 | 0 | 0 | 0 | 0 | None |
| 2 | 0 | 0 | 1 | 0 | Move back input number reader by one position |
| 3 | 0 | 0 | 2 | 0 | Move back input number reader by one position |
| 4 | 0 | 0 | 3 | 0 | Move back input number reader by one position |
| 5 | 0 | 0 | 4 | 0 | Move back input number reader by one position |
| 6 | 0 | 0 | 5 | 0 | Move back input number reader by one position |
| 7 | 0 | 0 | 6 | 0 | Move back input number reader by one position |
| 8 | 0 | 0 | 7 | 0 | Move back input number reader by one position |
| 9 | 0 | 0 | 8 | 0 | Move back input number reader by one position |
| 10 | 0 | 0 | 9 | 0 | Move back input number reader by one position |
| 11 | 0 | 0 | A | 0 | Move back input number reader by one position |
| 12 | 0 | 0 | F | 0 | Move back input number reader by one position |
| 13 | 0 | 1 | 0 | 0 | Move back target number reader by one position |
| 14 | 0 | 2 | 0 | 0 | Move back target number reader by one position |
| 15 | 0 | 3 | 0 | 0 | Move back target number reader by one position |
| 16 | 0 | 4 | 0 | 0 | Move back target number reader by one position |
| 17 | 0 | 5 | 0 | 0 | Move back target number reader by one position |
| 18 | 0 | 6 | 0 | 0 | Move back target number reader by one position |
| 19 | 0 | 7 | 0 | 0 | Move back target number reader by one position |
| 20 | 0 | 8 | 0 | 0 | Move back target number reader by one position |
| 21 | 0 | 9 | 0 | 0 | Move back target number reader by one position |
| 22 | 0 | decimal place indicator | 0 | 0 | Move back target number reader by one position |
| 23 | 0 | Space character | 0 | 0 | Move back target number reader by one position |
| 24 | 0 | Space character | Space character | 6 | None |

Figure 11 (b)

| Sl. No. | Current state | Digit in target number | Digit in input number | Next state | Action |
|---|---|---|---|---|---|
| 1 | 1 | 0 | Comma or other thousand separator | 1 | Move back target number reader by one position |
| 2 | 1 | 1 | Comma | 1 | Move back target number reader by one position |
| 3 | 1 | 2 | Comma | 1 | Move back target number reader by one position |
| 4 | 1 | 3 | Comma | 1 | Move back target number reader by one position |
| 5 | 1 | 4 | Comma | 1 | Move back target number reader by one position |
| 6 | 1 | 5 | Comma | 1 | Move back target number reader by one position |
| 7 | 1 | 6 | Comma | 1 | Move back target number reader by one position |
| 8 | 1 | 7 | Comma | 1 | Move back target number reader by one position |
| 9 | 1 | 8 | Comma | 1 | Move back target number reader by one position |
| 10 | 1 | 9 | Comma | 1 | Move back target number reader by one position |
| 11 | 1 | Space character | Comma | 1 | Move back target number reader by one position |
| 12 | 1 | Comma | 0 | 1 | Move back input number reader by one position |
| 13 | 1 | Comma | 1 | 1 | Move back input number reader by one position |
| 14 | 1 | Comma | 2 | 1 | Move back input number reader by one position |
| 15 | 1 | Comma | 3 | 1 | Move back input number reader by one position |
| 16 | 1 | Comma | 4 | 1 | Move back input number reader by one position |
| 17 | 1 | Comma | 5 | 1 | Move back input number reader by one position |
| 18 | 1 | Comma | 6 | 1 | Move back input number reader by one position |
| 19 | 1 | Comma | 7 | 1 | Move back input number reader by one position |
| 20 | 1 | Comma | 8 | 1 | Move back input number reader by one position |
| 21 | 1 | Comma | 9 | 1 | Move back input number reader by one position |
| 22 | 1 | Comma | Space character | 1 | Move back input number reader by one position |
| 23 | 2 | 0 | Comma | 2 | Move back target number reader by one position |
| 24 | 2 | 1 | Comma | 2 | Move back target number reader by one position |

Figure 12 (b)

| Sl. No. | Current state | Digit in target number | Digit in input number | Next state | Action |
|---|---|---|---|---|---|
| 25 | 2 | 2 | Comma | 2 | Move back target number reader by one position |
| 26 | 2 | 3 | Comma | 2 | Move back target number reader by one position |
| 27 | 2 | 4 | Comma | 2 | Move back target number reader by one position |
| 28 | 2 | 5 | Comma | 2 | Move back target number reader by one position |
| 29 | 2 | 6 | Comma | 2 | Move back target number reader by one position |
| 30 | 2 | 7 | Comma | 2 | Move back target number reader by one position |
| 31 | 2 | 8 | Comma | 2 | Move back target number reader by one position |
| 32 | 2 | 9 | Comma | 2 | Move back target number reader by one position |
| 33 | 2 | Space character | Comma | 2 | Move back target number reader by one position |
| 34 | 2 | Comma | 0 | 2 | Move back input number reader by one position |
| 35 | 2 | Comma | 1 | 2 | Move back input number reader by one position |
| 36 | 2 | Comma | 2 | 2 | Move back input number reader by one position |
| 37 | 2 | Comma | 3 | 2 | Move back input number reader by one position |
| 38 | 2 | Comma | 4 | 2 | Move back input number reader by one position |
| 39 | 2 | Comma | 5 | 2 | Move back input number reader by one position |
| 40 | 2 | Comma | 6 | 2 | Move back input number reader by one position |
| 41 | 2 | Comma | 7 | 2 | Move back input number reader by one position |
| 42 | 2 | Comma | 8 | 2 | Move back input number reader by one position |
| 43 | 2 | Comma | 9 | 2 | Move back input number reader by one position |
| 44 | 2 | Comma | Space character | 2 | Move back input number reader by one position |
| 45 | 3 | 0 | Comma | 3 | Move back target number reader by one position |
| 46 | 3 | 1 | Comma | 3 | Move back target number reader by one position |
| 47 | 3 | 2 | Comma | 3 | Move back target number reader by one position |
| 48 | 3 | 3 | Comma | 3 | Move back target number reader by one position |

Figure 12 (b) *(continued)*

| Sl. No. | Current state | Digit in target number | Digit in input number | Next state | Action |
|---|---|---|---|---|---|
| 49 | 3 | 4 | Comma | 3 | Move back target number reader by one position |
| 50 | 3 | 5 | Comma | 3 | Move back target number reader by one position |
| 51 | 3 | 6 | Comma | 3 | Move back target number reader by one position |
| 52 | 3 | 7 | Comma | 3 | Move back target number reader by one position |
| 53 | 3 | 8 | Comma | 3 | Move back target number reader by one position |
| 54 | 3 | 9 | Comma | 3 | Move back target number reader by one position |
| 55 | 3 | Space character | Comma | 3 | Move back target number reader by one position |
| 56 | 3 | Comma | 0 | 3 | Move back input number reader by one position |
| 57 | 3 | Comma | 1 | 3 | Move back input number reader by one position |
| 58 | 3 | Comma | 2 | 3 | Move back input number reader by one position |
| 59 | 3 | Comma | 3 | 3 | Move back input number reader by one position |
| 60 | 3 | Comma | 4 | 3 | Move back input number reader by one position |
| 61 | 3 | Comma | 5 | 3 | Move back input number reader by one position |
| 62 | 3 | Comma | 6 | 3 | Move back input number reader by one position |
| 63 | 3 | Comma | 7 | 3 | Move back input number reader by one position |
| 64 | 3 | Comma | 8 | 3 | Move back input number reader by one position |
| 65 | 3 | Comma | 9 | 3 | Move back input number reader by one position |
| 66 | 3 | Comma | Space character | 3 | Move back input number reader by one position |

Figure 12 (b) *(continued)*

| Sl. No. | Handling decimal place | | | | |
|---|---|---|---|---|---|
| | Current state | Digit in target number | Digit in input number | Next state | Action |
| 1 | 1 | dot (decimal place indicator) | 0 | 4 | None |
| 2 | 1 | dot | 1 | 4 | None |
| 3 | 1 | dot | 2 | 4 | None |
| 4 | 1 | dot | 3 | 4 | None |
| 5 | 1 | dot | 4 | 4 | None |
| 6 | 1 | dot | 5 | 4 | None |
| 7 | 1 | dot | 6 | 4 | None |
| 8 | 1 | dot | 7 | 4 | None |
| 9 | 1 | dot | 8 | 4 | None |
| 10 | 1 | dot | 9 | 4 | None |
| 11 | 1 | dot | Space character | 4 | None |
| 12 | 1 | Space character | dot | 4 | None |
| 13 | 1 | 0 | dot | 5 | None |
| 14 | 1 | 1 | dot | 5 | None |
| 15 | 1 | 2 | dot | 5 | None |
| 16 | 1 | 3 | dot | 5 | None |
| 17 | 1 | 4 | dot | 5 | None |
| 18 | 1 | 5 | dot | 5 | None |
| 19 | 1 | 6 | dot | 5 | None |
| 20 | 1 | 7 | dot | 5 | None |
| 21 | 1 | 8 | dot | 5 | None |
| 22 | 1 | 9 | dot | 5 | None |
| 23 | 2 | dot | 0 | 4 | None |
| 24 | 2 | dot | 1 | 4 | None |
| 25 | 2 | dot | 2 | 4 | None |
| 26 | 2 | dot | 3 | 4 | None |
| 27 | 2 | dot | 4 | 4 | None |
| 28 | 2 | dot | 5 | 4 | None |
| 29 | 2 | dot | 6 | 4 | None |
| 30 | 2 | dot | 7 | 4 | None |
| 31 | 2 | dot | 8 | 4 | None |
| 32 | 2 | dot | 9 | 4 | None |
| 33 | 2 | 0 | dot | 5 | None |
| 34 | 2 | 1 | dot | 5 | None |
| 35 | 2 | 2 | dot | 5 | None |
| 36 | 2 | 3 | dot | 5 | None |
| 37 | 2 | 4 | dot | 5 | None |
| 38 | 2 | 5 | dot | 5 | None |
| 39 | 2 | 6 | dot | 5 | None |
| 40 | 2 | 7 | dot | 5 | None |

Figure 13 (b)

| Handling decimal place | | | | | |
|---|---|---|---|---|---|
| Sl. No. | Current state | Digit in target number | Digit in input number | Next state | Action |
| 41 | 2 | 8 | dot | 5 | None |
| 42 | 2 | 9 | dot | 5 | None |
| 43 | 2 | Space character | dot | 5 | None |
| 44 | 2 | dot | Space character | 5 | None |
| 45 | 3 | 0 | dot | 5 | None |
| 46 | 3 | 1 | dot | 5 | None |
| 47 | 3 | 2 | dot | 5 | None |
| 48 | 3 | 3 | dot | 5 | None |
| 49 | 3 | 4 | dot | 5 | None |
| 50 | 3 | 5 | dot | 5 | None |
| 51 | 3 | 6 | dot | 5 | None |
| 52 | 3 | 7 | dot | 5 | None |
| 53 | 3 | 8 | dot | 5 | None |
| 54 | 3 | 9 | dot | 5 | None |
| 55 | 3 | dot | Space character | 7 | Move back input number reader by one position |
| 56 | 3 | Space character | dot | 7 | Move back target number reader by one position |
| 57 | 3 | dot | dot | 7 | None |
| Note: Transitions from state 7 to end states are not shown in Figure 13(b). | | | | | |

Figure 13 (b) (*continued*)

| Target number(a) | Input number (b) | Final Result |
|---|---|---|
| 0 | 1 | 1 |
| 1 | 0 | 0 |
| 1 | 1 | Follow normal comparison method without considering signs of the numbers |
| 0 | 0 | Opposite of result of normal comparison without considering signs |

| Type of input number | Input number | Time in milliseconds for 1 million searches by traditional method | Time in milliseconds for 1 million searches by proposed method | Percentage reduction in time |
|---|---|---|---|---|
| Number with + and decimal | +00102010944.12 | 106407 | 52395 | 50.76% |
| Number with leading zeroes | 00102010944 | 94579 | 41963 | 55.63% |
| Number with many leading zeroes | 00000102010944 | 111358 | 64372 | 42.19% |
| Moderately large number | 102010944 | 86814 | 42479 | 51.07% |
| Moderately large number with many digits after decimal point | 102010943.12345 | 122387 | 58484 | 52.21% |
| Large number | 102010941111.12 | 127907 | 58241 | 54.47% |
| Very large number | 1020109441 ... stream of 1's to build a 100 digit number | 400488 | 133464 | 66.67% |
| Small number | 102.12 | 79817 | 45919 | 42.47% |
| Small number with many digits after decimal point | 102.1234567891 | 98837 | 58428 | 40.88% |
| | | | Average reduction | 50.71% |

Figure 15

METHOD AND SYSTEM FOR NUMBER COMPARISON DURING STREAM PROCESSING

REFERENCE TO RELATED APPLICATION

This application claims priority under 35 U.S.C. §119 to Indian Application No. 201611007627, filed on 4 Mar. 2016, the entirety of which is hereby incorporated herein by reference.

FIELD OF INVENTION

The invention relates to a method and system for number comparison during stream processing, specifically, to a method and system for fast comparison of large integral or decimal numbers directly from their ASCII character based representation without converting them into number representation as maintained in computer.

BACKGROUND

Number comparison is a very common activity in programming tasks. Typically, computers keep integers in 2's complement form and decimal numbers in IEEE standard 754. In existing comparison method, each number need to be converted into integer or decimal numbers as maintained in computer before comparison. For example, integer conversion is done by traversing through the digits from the beginning and multiplying the converted part by 10 and then adding the product with the next digit which then becomes converted part for next iteration.

As explained above, it takes time to convert numbers, e.g. ASCII codes, into a computer based number format in the existing comparison method. However, in certain functional areas such as stream processing where available time to process individual records is very less, typically a few milliseconds, e.g. 1-5 milliseconds. For example, during a telecom call detail record processing, a common requirement is to know which operators do the calling and called number belong to. Since mobile number portability is in use in many countries, it is not possible to identify operators by checking whether the mobile number belongs to a particular block. Typically, a large number of blocks are to be checked for this purpose. Since the ranges are too numerous, e.g. 500,000 blocks for a country like Netherlands, it is not convenient to load these entirely in computer memory. A frequently used approach for this kind of search is to decide a coarse block from memory based search and then do a record by record search within the bigger block in hard disk. Traditionally, the input number is checked with start of the range and end of the range. If it falls in between, the operator ID is picked up from this record. Since master files with ranges are generally made available by public agencies for diverse use, they encode the start and end of range using human readable ASCII character codes. Commonly, the input number, start of the range and end of the range are first converted from ASCII to numbers, as maintained in computer, and then two simple number comparisons are done.

It is therefore desirable to provide a comparison method faster than the existing method, especially when the numbers are very big.

SUMMARY OF INVENTION

In order to provide a faster way for comparing numbers during stream processing, embodiments of the invention provide a solution in which the numbers need not to be converted into integer or decimal numbers as maintained in computer before comparison such that it takes less time to obtain a comparison result during stream processing.

According to one aspect of the invention, a method for number comparison during stream processing is provided. The method comprises:

generating, by a state machine, a current index associated with the given number based on a current digit pair including a first current digit from the given number and a second current digit from the target number, and a current state information associated with the given number; and looking up, by the state machine, the generated current index in a preset state transition table to identify a next state information, wherein the preset state transition table maintains a plurality of mappings, each of the mappings is between an index and a next state information;

if the current digit pair includes a last digit of the given number or a last digit of the target number, determining, by the state machine, a final comparison result based on the identified next state information; and if the current digit pair includes neither a last digit of the input number nor a last digit of the target number, taking on, by the state machine, the identified next state information as the current state information associated with the input number for comparison of a next digit pair.

According to another aspect of the invention, a system for comparing a given number and a target number during stream processing is provided. The system comprises a processor and a memory communicably coupled thereto, wherein the memory is configured to store data to be executed by the processor, wherein the processor is configured to generate a current index associated with the given number based on a current digit pair including a first current digit from the given number and a second current digit from the target number, and a current state information associated with the given number; and look up the generated current index in a preset state transition table to identify a next state information, wherein the preset state transition table maintains a plurality of mappings, each of the mappings is between an index and a next state information;

if the current digit pair includes a last digit of the given number or a last digit of the target number, determine a final comparison result based on the identified next state information; and if the current digit pair includes neither a last digit of the given number nor a last digit of the target number, take on the identified next state information as the current state information associated with the given number for comparison of a next digit pair.

Embodiments of the invention use successive comparison of digit pairs from a given number and a target number to decide whether the given number received by the state machine is bigger, smaller or equal to the target number. The essence of this mechanism is to assign appropriate states to the status of comparisons up to a specific instance during traversal steps and then move from one state to another state until one of the target states is reached or widths of both numbers are traversed. The machine mostly moves forward. However, sometimes, it moves back. For example, if a given number 01234 is compared with a target number 1234, after the state machine traverses over the first current digit pair 01, instead of moving to the next digit pair 12, the pointer of reader of the given number is moved back such that the next digit pair to be compared becomes 11. This effectively allows to skip leading zero in the given number. As is obvious, this rule will only be used if the current state is initial state since the purpose is to skip initial set of zeros in the given number and/or the target number. This means that next state information and movements of reader of the two numbers are dependent on current state information. Now consider 01234 and 01235. In this case, it is not necessary to move back, the initial state is maintained after traversing through 00. Essentially, the invention shows that it is possible to device a state machine for number comparison purpose and provides state details and state transition table entries. The method provided by this invention is faster than the existing number comparison methods, especially when the number is very big.

BRIEF DESCRIPTION OF THE DRAWINGS

The invention will be described in detail with reference to the accompanying drawings, in which:

FIG. 2 shows a table illustrating the comparison process according to a first example of the invention;

FIG. 3 shows a table illustrating the comparison process according to a second example of the invention;

FIG. 4 shows a table illustrating the comparison process according to a third example of the invention;

FIG. 6 shows a table illustrating the structure of an index generated to lookup to decide a next state according to one embodiment of the invention;

FIG. 7 shows a table illustrating the encoded values of the states according to one embodiment of the invention;

FIG. 8 shows a table illustrating the encoded values of the target and input number according to one embodiment of the invention;

FIG. 9 shows a table illustrating a structure of state information as obtained from lookup in state transition table according to one embodiment of the invention;

FIG. 10 shows an example of the preset state transition table;

FIG. 14(b) shows a preset final result table according to one embodiment of the invention;

FIG. 15 shows a table illustrating performance analysis of the proposed method for number comparison compared with that of a traditional method;

DETAILED DESCRIPTION OF EMBODIMENTS OF THE INVENTION

Figure 1:
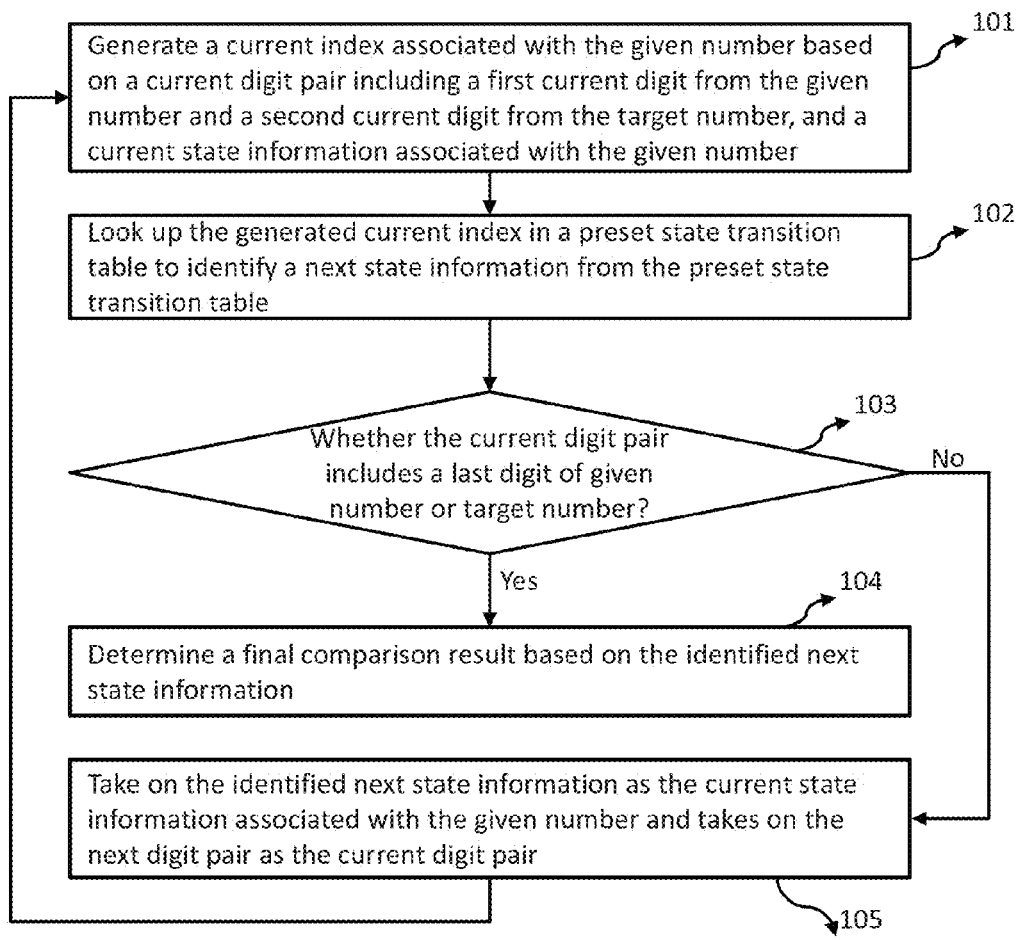
FIG. 1 is a flow chart illustrating the method for comparing numbers during a stream processing according to one embodiment of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

Embodiments of the invention provide an efficient method for comparing numbers during stream processing. In this method, the two numbers to be compared need not to be converted into integer or decimal number, each pair of digits in the two numbers are directly compared and a comparison result is obtained according to a pre-set state transition table. Referring to FIG. 1, according to one embodiment of the invention, the method for comparing a given number, e.g. an input number, and a target number during stream processing comprises the following steps:

In Block 101, a state machine generates a current index associated with the given number based on a current digit pair including a first current digit from the given number and a second current digit from the target number, and a current state information associated with the given number.

In one example of the embodiment, the current index associated with the given number includes 12 bits, wherein 4 bits are used for defining the current state information associated with the given number, 4 bits are used for defining the first current digit from the given number and the remaining 4 bits are used for defining the second current digit from the target number.

In Block 102, the state machine looks up the generated current index in a preset state transition table to identify a next state information from the preset state transition table. The preset state transition table maintains a plurality of mappings each between an index and a next state information.

In Block 103, the state machine determines whether the current digit pair includes a last digit of the given number or a last digit of the target number, if yes, the flow chart proceeds to block 104, if no, the flow chart proceeds to block 105.

In Block 104, the state machine determines a final comparison result based on the identified next state information.

The final comparison result has many uses in real world for ultra-low latency requirements in telecommunication systems. In one example, in 4G, calls can be completed by base station itself if both caller and callee are served by the same base station. This needs a real-time look-up and may involve number comparison. In another example, a common requirement in many telecom systems is to identify, in real-time, which telephone number is served by which operator. Since mobile number portability is in use in many countries now, it is not possible to apply a simple number series based comparison. Rather, a detailed block based table lookup where table size is very big, typically hundreds of thousands of entries, has to be employed. The mentioned search needs fast comparison of big numbers, typically 10 digits or more in length.

In Block 105, the state machine takes on the identified next state information as the current state information associated with the given number and takes on the next digit pair as the current digit pair, and the flow chart proceeds back to block 101 to conduct the comparison of the next digit pair.

As described above, the proposed invention checks pair of digits, from target and given number, as it goes along. It keeps track of the results of this traversal using a state machine. At any time if the state machine concludes on the comparison result, the normal computation is stopped. At this stage, a secondary traversal may be done on rest of the digit strings of the numbers, both the given number and the target number, to ensure that there is no formatting error. If no formatting error is detected, then earlier conclusion by the state machine is output. Compared with the traditional method of comparison, the method disclosed in embodiments of the invention is more efficient, because the neither the target number nor the given number need to be converted into integer or decimal number. A simple comparison example is explained below.

In this example, the target number is 1234, and the given number is an input number 456. In order to determine whether the input number is greater, equal or smaller than the target number, the following process will be conducted:

Preparatory step: Pad input number with a space, i.e. "456(space)". Note that the target number is in a file with fixed width for it. If width is not filled with digits then space is expected.

First, digit 1 from the target number and digit 4 from the given number are checked. Since 4 is greater than 1, internal state is set to "possibly greater" meaning input number is possibly greater than the target number.

Next, digit 2 from the target number and digit 5 from the given number are checked. Since 5 is greater than 2, the earlier state i.e. "possibly greater" is maintained.

Next, digit 3 from the target number and digit 6 from the given number are checked. Since 6 is greater than 3, the earlier state i.e. "possibly greater" is maintained.

Next, digit 4 from the target number and space from the given number are checked. As per the machine state transition rules, the state is output as "small", based on the fact that earlier state was "possibly greater" and now space is received in input number and a regular digit between 0 to 9 is received in target number, meaning that input number is smaller than target number.

As can be seen, this method traverses over the digits just once. Precisely speaking, only for handling leading zeros, the machine stays over same character; otherwise it traverses over the digits just once. It makes the correct decision by following the states and state transitions in a proper manner. The actual algorithm is more complex than explained above since it handles "+" or "−" signs at the beginning, decimal place indicators ".", any number of zeros in the beginning and separator characters like comma. State transition rules are maintained in an array. The array index is made up of state (encoded as number), digit of target number and digit of input number. This arrangement alleviates the need for search and locates the correct entry in array directly. To reduce the array size, state and the digits are packed into individual nibbles. So, 12 bits containing 4 bits for state, 4 bits for digit of target number and 4 bits for digit of input number are needed to represent an array index. Consequently, an array of 4096 length is needed. Since array will hold output states and only 7 states are there, array data type is byte. As will be apparent, this byte contains 4 bits of state information, a single bit for forward movement indicator and another single bit for backward movement indicator and two bits are kept for future use. In effect, 4096 bytes or 4 KB for transition rule storage are used. For current day commodity hardware, this memory requirement is not big and no special attention is required from hardware side to use proposed method. One example of the state transition rules is shown in FIG. 10 which is a preset state transition table maintaining a plurality of mappings each between an index and a result byte, i.e. a next state value or a final state value.

This invention provides a state machine based novel method for fast in-place comparison of numbers, both integer and decimal. The context of this invention is there is a need to check whether a given number falls between a series of start and end range values provided to us in a text file. Both the numbers—start and end of ranges—have their own positions and width in the file. If the number cannot fill up the width specified, then file comes with spaces in those locations. All three numbers, start and end of range and input number are coded in ASCII i.e. each digit, decimal and signs are coded using ASCII coding. Input number is part of streaming data and series of ranges in file for each input number is to be checked in real-time. All three numbers are typically big, approximately 10 digit long integers. Obviously, the major work involved here is a series of comparisons in trying to find a match. If a match is found, then a portion of the record, between given start and end character positions, is extracted as outcome and further checking for the same input is stopped.

There could be many practical scenarios where large numbers of number comparisons are required to be made in lowest possible time. One such scenario is deciding operator identifiers for calling and called numbers during telecom call detail record processing. Operator identifiers are typically used to analyze operator-wise business volume as well as capacity decisions for points of interconnection. They can also be used for operator-based differential charging. For a country like India with approximately 885 million mobile connections, 12 mobile operators and prevalent mobile number portability, the number of ranges to search to identify operators is enormous. Though part of the ranges can be loaded in RAM and a more efficient method can be used for searching, there is still a need for record by record search because of numerous ranges.

The essence of stream processing is low latency. Traditional comparison first converts ASCII based numbers into format as maintained in computer i.e. 2's complement for integer and IEEE Standard 754 for floating point number. Then comparison is made between numbers. Since comparison is implemented using special purpose comparator circuits, it is fast. However, converting the number in ASCII representation to computer number format takes time. Intuitively, the conversion can be avoided if a decision can be made by comparing ASCII digits. The comparison is trivial if the input and target number has same width and doesn't have unequal number of zeroes in the beginning. However, a method which takes care of both integer and decimal numbers, handles any number of leading zeroes, works fine with decimal place indicators and positive/negative signed number ('+' and '−') as well as unsigned numbers and handles format error gracefully is non-trivial.

The proposed invention uses the following approach to compare numbers. When humans see numbers, humans seem to decide based on number length, digits, use of decimal place indicator etc. Humans do not always seem to mentally convert a big number as millions or billions to compare with a smaller number which is of 4 digits. Even if both the numbers are big, humans try to find dissimilarities to discern which one is bigger. Inherent in this way of analysis is that while humans see numbers, they make incremental inferences continuously and stop when they feel certain.

Let's take an example to compare an input number and a target number:

Target number: 1234
Input number: 1439

Each pair of digits (1, 1), (2, 4), (3, 3) and (4, 9) are sequentially analyzed to keep track of the last decision made. The comparison result byte of each step and the final comparison result are shown in FIG. 2. Referring to FIG. 2, at the beginning, the current state associated with the input number is initial state; then, the first digit pair (1,1) is compared, the identified next state is "possibly equal" state, accordingly, the current state associated with the input number is changed to "possibly equal" state; next, the second digit pair (2, 4) is compared, since the current state is "possibly equal" state, it is inferred that the next state is "possibly greater" state. But it is not the final comparison result since the input number may be lengthwise smaller than the target number; then the current state is changed to the "possibly greater" state; next, the third digit pair (3,3) is compared, the next state is identified as the same as the current state, i.e. "possibly greater" state; next, the fourth digit pair (4, 9) is compared, since the current state is "possibly greater" state and same number of digits have been encountered in both numbers, it is inferred to remain in the same state; finally, since the digit pair (4, 9) is the last digit pair in the two numbers, the final comparison result is generated based on the "possibly greater" state. The final comparison result is "greater" state, meaning that the input number is greater than the target number.

Let's take another example. In this example, the target number includes one leading zero.

Target number: 01234
Input number: 1235

Each pair of digits is analyzed as shown in FIG. 3. Referring to FIG. 3, before comparing any digit pair, the current state associated with the input number is initial state; then the process proceeds to compare the first digit pair (0,1), since the current state is the initial state, and a leading zero is identified in the target number, the state machine skips the leading zero digit and stay in the initial state. It means that the next step is to compare the digit pair (1,1) instead of (1,2). The initial state value may be 0.

To see how decimal numbers are handled, let's go through steps involved in a simple case with two decimal numbers.

Target number: 123.45
Input number: 12.345

Each pair of digits is analyzed as shown in FIG. 4. Referring to FIG. 4, before comparing any digit pair, the current state is the initial state, the current state value may be 0; then, the first digit pair (1,1) is compared, the next state associated with the input number is identified as "possibly equal" state; next, the second digit pair (2, 2) is compared, the next state associated with the input number is remained in "possibly equal" state; next, the third digit pair (3, . (dot)) is compared, the next state associated with the input number is identified as "smaller" state since a decimal place indicator is encountered in the input number and a normal digit is encountered in the target number. Then, the comparison is stopped since a final state has been identified. However, the process may be continued to traverse rest of the digit pairs in the numbers to ensure that these indeed are valid numbers, meaning that these numbers do not contain any character other than 0-9, dot etc.

Figure 5:
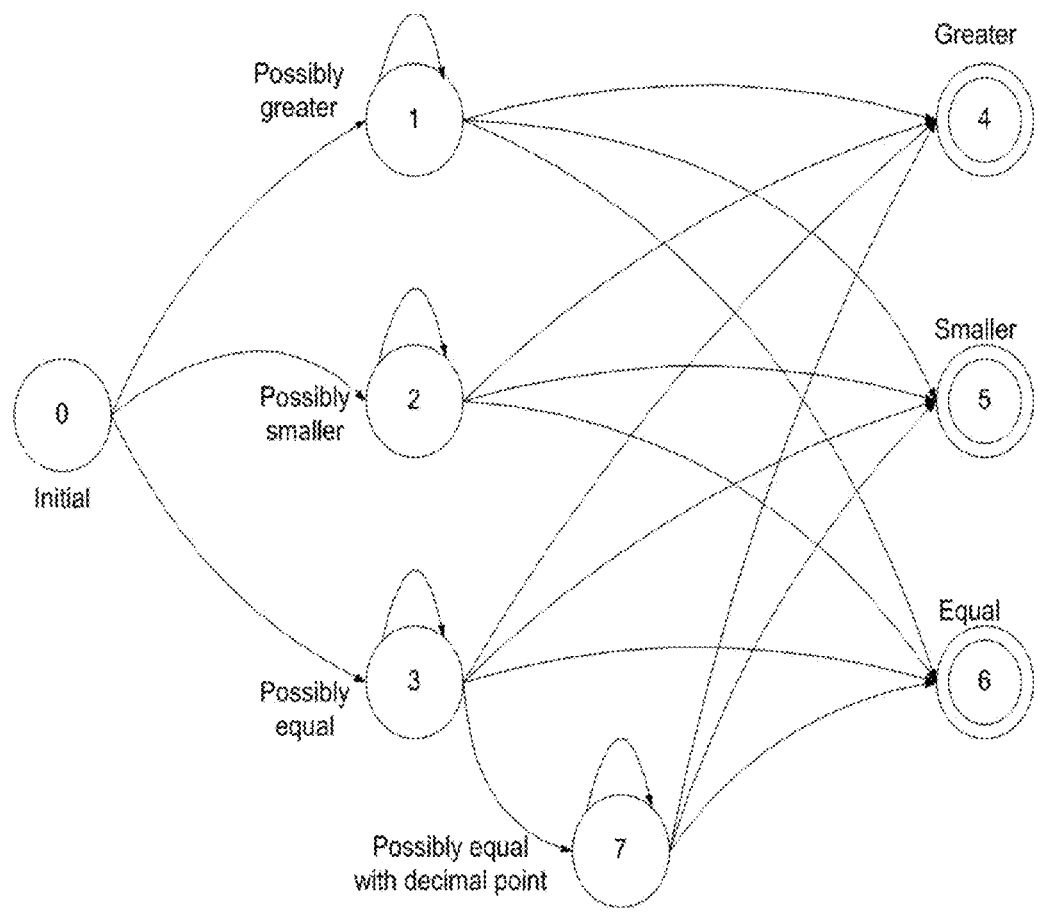
FIG. 5 shows the overall state transitions according to embodiments of the invention.

There are more details involved in the proposed method e.g. handling sign characters, handling thousand separators, verifying presence of format issue in an efficient way etc. However, essentially, the proposed method deviates from converting ASCII representations to computer based number formats by having a state based method and traverses over the digit strings only once. Both of these considerations improve performance drastically. Even though computer format based number comparison is implemented in hardware as a special circuit, proposed arrangement reduces average comparison time by half. FIG. 5 depicts state transitions at an overall level.

"Greater", "smaller" or "equal" are final results of comparing input number with target number i.e. input>target, input<target and input=target All the states except "possibly equal with decimal place indicator" are self-explanatory. State 7 is treated separately than state 3 since transitions to other states are different from these two situations. For clarity, let us consider following two examples:

EXAMPLE 1

Target number: 1234
Input number: 1235

While the last digit pair (4, 5) is compared, the current state value is 3, i.e. the current state is "possibly equal" state, then after comparing the last digit pair (4, 5), the next state is "possibly greater", i.e. the state value 1.

EXAMPLE 2

Target number: 123.4
Input number: 123.5

While the last digit pair (4, 5) is compared, the current state value is 7 instead of 3, i.e. the current state is "possible equal with decimal place indicator", then the next state is the "greater" state, i.e. the state value 4. To differentiate between these two situations, we move to state 7, instead of state 3, when the digit pair (. (dot), . (dot)) in the example 2 is reached.

The proposed method in this invention works as follows:

As part of setup activities, a state transition table is generated. The table index consists of 12 bits of information arranged as mentioned below according to one embodiment of the invention. Table 1 in FIG. 6 shows Structure of index used to lookup to decide next state. States are encoded according to the Table 2 shown in FIG. 7. Target and input digits are encoded according to Table 3 shown in FIG. 8.

Lookup in the state transition table returns next state information in a single byte. Next state information also includes move indicator for target and input numbers as shown in FIG. 8.

State transition table is generated based on the understanding of how it is inferred that the input number is greater, smaller or equal to the target number. This is the key point of the method. Majority of the transitions are straightforward except for few special situations which are described in more detail in sections that follow.

The method traverses through the digits of target number and input number by generating an index and looking up the index in a preset state transition table. The index comprises current state (4 bits), digit from target number (4 bits) and digit from input number (4 bits). As mentioned above, lookup in state transition table returns a byte. On receiving this result byte, the following actions are taken:

a. Check 8th bit and if move indicator for target number is set, target number pointer is moved back by one position.

b. Check 7th bit and if move indicator for input number is set, input number pointer is moved back by one position c. Extract 4 LSB bits and use it as current state If lookup in the state transition table returns a default value (for our experimentation, 0x0B is considered) indicating that lookup was not successful, digits in input or target or both are inappropriate and a format error is produced. Format validation can optionally be done during encoding of digits of target and input characters; however for performance reasons, format validation is performed during lookup.

At the end of each iteration step, the method checks whether any of the end states i.e. 4, 5 or 6, is reached. If yes, state based checking ceases and individual checks on remaining digits (until space character is encountered or number boundary as specified by width is reached) of both numbers is performed to ensure that number formats are correct. If number formats are correct, comparison result is produced; else, a format error is produced.

One specific format validation namely presence of multiple dots can't be directly handled during encoding of digits as well as during lookup in state transition table. This is done by having two counters, each with initial value as 2, for target and input numbers and reducing by 1 whenever a dot is encountered. After every such reduction, a check is performed: if the counter is zero and, if so, an error is output. This check is performed both during digit encoding as well as extra digit validation at the end. To avoid an 'if' based check for performance reasons, digit encoding array is made two-dimensional; second dimension contains zero for all digits except for dot.

One example of the preset state transition table entries is shown in FIG. 10. In this example, each index is generated by: state+target digit+input digit; and each result byte includes a byte containing state value and movement indicators. For example, the index 0X010 defining current state value 0 (the corresponding binary value 0000)+target digit 1 (the corresponding binary value 0001)+input digit 0 (the corresponding binary value 0000), the corresponding result byte is 0X80 defining the next state value 0 (the corresponding binary value 0000)+movement indicator of the target number is on (the corresponding binary value 1000); the index 0X19F defining current state value 1 (the corresponding binary value 0001)+target digit 9 (the corresponding binary value 1001)+input digit F (meaning there is a space character), the corresponding result byte is 0X05 defining the next state value 5 (the corresponding binary value 0101)+no movement indicator 0 (the corresponding binary value 0000). Based on the preset lookup table and the encoding rules, e.g. the encoding rules shown in FIG. 5 and FIG. 6, the state machine can generate an index based on the current state value and the values of each digit pair of the two numbers, i.e. the given number and the target number, and lookup the generated index to identify next state information including the next state value and movement indicators of the two numbers. Then the next state value will be considered as current state value for comparison of a next digit pair. Once all of the digit pairs of the two numbers have been traversed or a final state value is identified, the final comparison result will be determined and the comparison will be stopped.

Handling of any Number of Leading Zeroes

Figure 11:
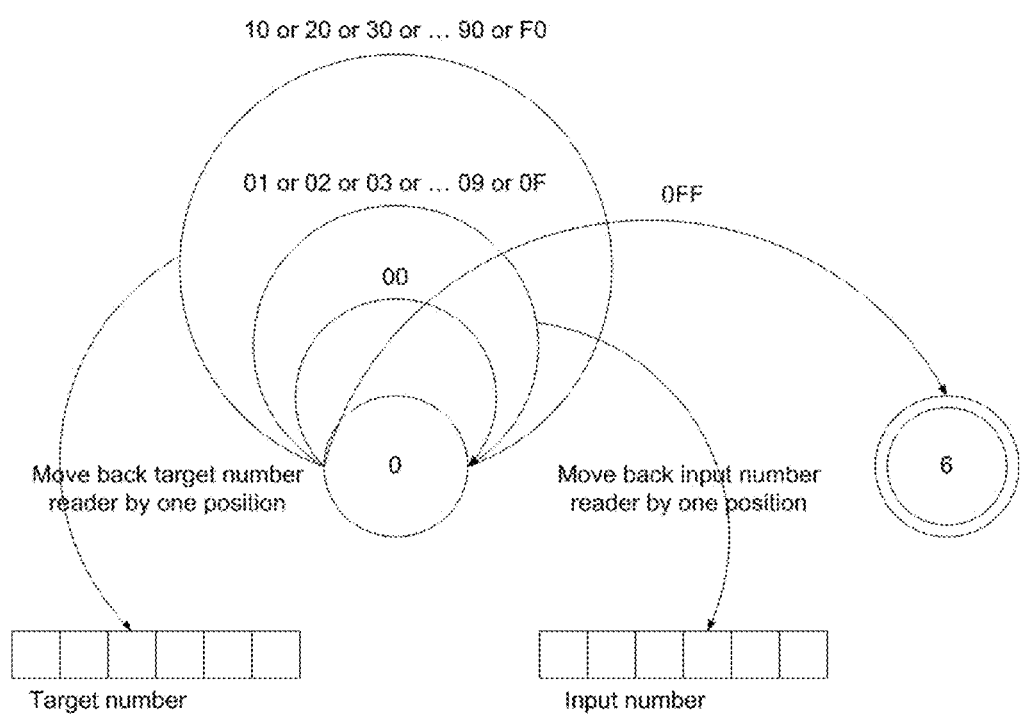
FIGS. 11 (a) and (b) show a state transition process when handling any number with leading zeroes during comparison according to one embodiment of the invention.

In some embodiments of the invention, both the input and target number can have any number of leading zeroes. The special treatment is needed only when the state machine is in initial state and zero is encountered in either input or target number. The basic idea is that initial state is maintained only while "skipping" over the zeroes. In normal traversal, counter is increased in both numbers after each index formation and lookup. When moving forward in any number is not desired, the normal flow is not disturbed but the pointer is moved back by one position based on move indicators received on result byte (bit positions 7 and 8) from state transition table lookup. FIGS. 11 (a) and (b) depict the corresponding state transitions according to one example of the invention. Referring to FIGS. 11(a) and (b), if the current state is "0", i.e. initial state, and any one of the first current digit in the current digit pair from the target number and the second current digit in the current digit pair from the input digit is 0, the other one is any one of "0, 1, 2, 3, 4, 5, 6, 7, 8, 9, A, F", then the next state remains "0", i.e. initial state.

Initial state is indicated by state code 0 at the middle of the figure. The incoming tokens are a sequence of digit from target number and input number, left to right. During the course of skipping leading zeroes, if end of digit strings is reached in both numbers, end state "6-Equal" is taken on.

Handling of Thousand or Similar Other Separators

Figure 12:
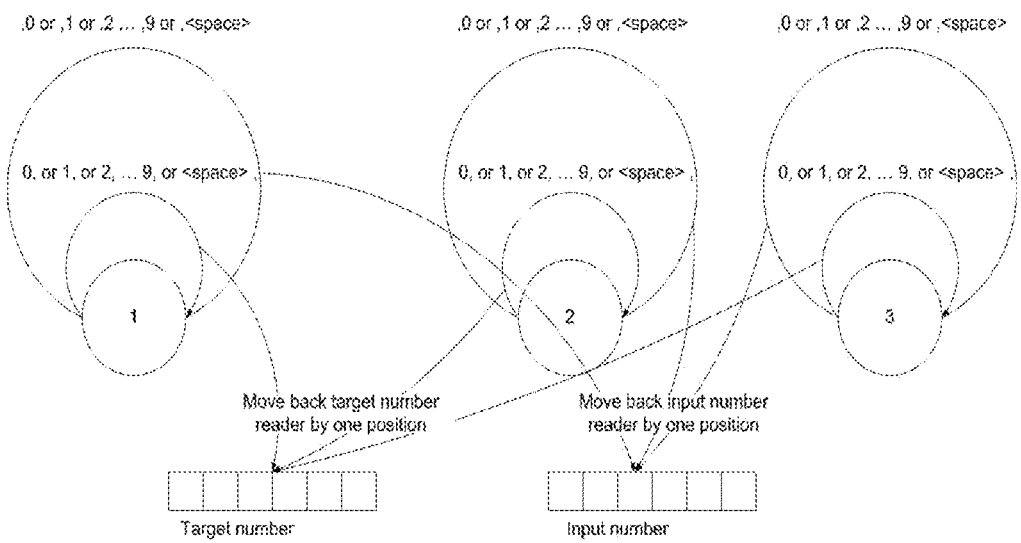
FIGS. 12 (a) and (b) show a state transition when handing thousand or other separators during comparison according to one embodiment of the invention.

Handling of thousand separators just involves skipping those separators. FIGS. 12(a) and (b) depict relevant state transitions on encountering separator either in input number or in target number or in both numbers according to one example of the invention. As is intuitive, separator can only appear while in state "1—possibly greater", "2—possibly small" or "3—possibly equal". If separator is encountered while the current state is other states e.g. "0—Initial" or "7—possibly equal with decimal", format error is generated since no corresponding state transition is configured. Referring to FIGS. 12 (a) and (b), if a comma or another thousand separator appears in either of the input number or the target number, or both, the next state will be same as the current state, and the reader of the number in which the comma or thousand separator appears will be moved back one position.

Handling Decimal Place Indicator

Figure 13:
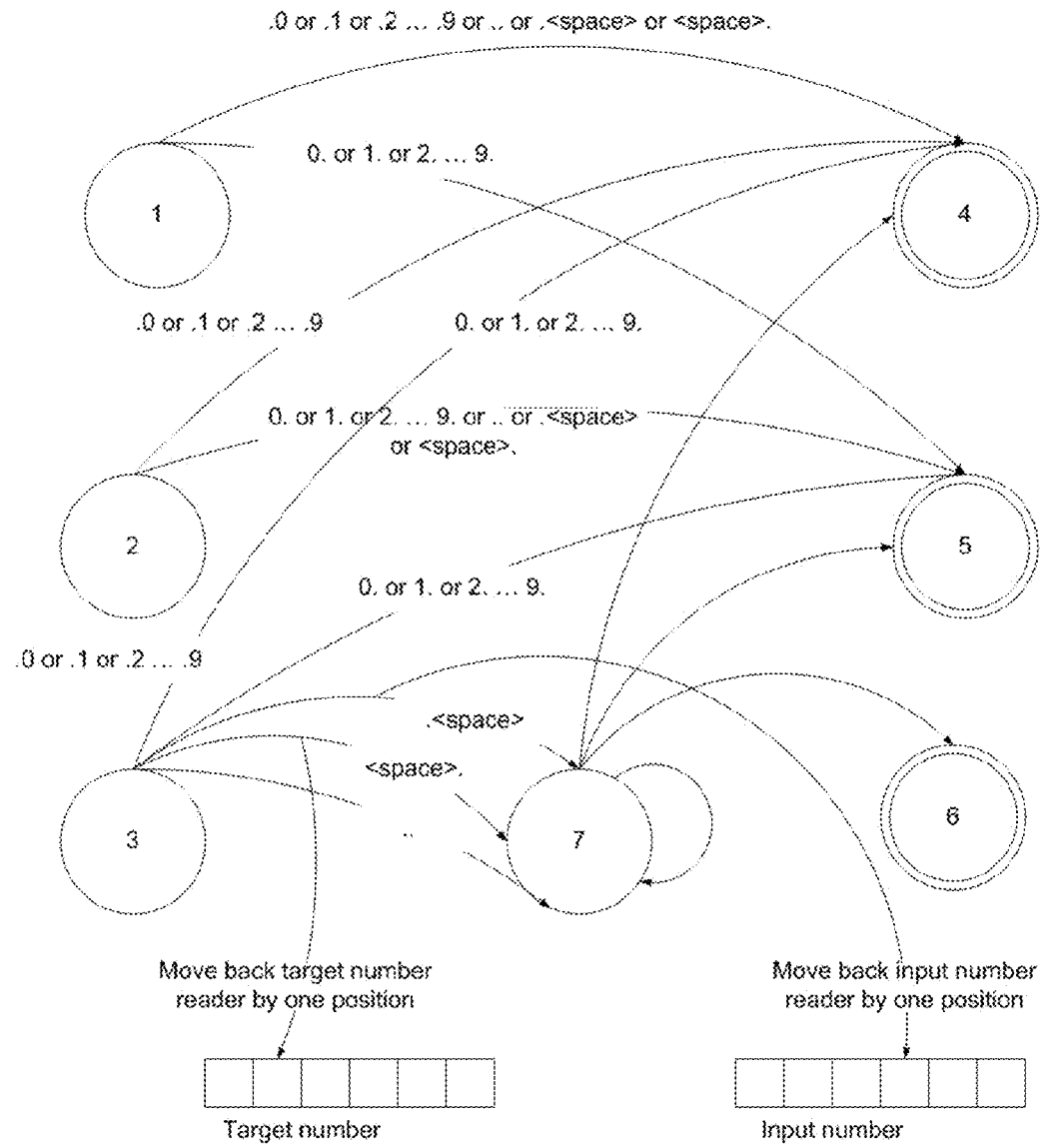
FIGS. 13 (a) and (b) show a state transition when handing decimal place indicator during comparison according to one embodiment of the invention.

Decimal place indicators/decimal points may appear in any of the input and target numbers or both. In a simple situation, in the current state is "1—Possibly greater" state and a decimal digit appears in target number and a normal digit (between 0 and 9) in input number. Then, it is easy to understand that input number is greater than target number and hence the next state moves to state "4—Greater". Similar such situations can easily be thought of to cover all possible tokens and corresponding state transitions. FIGS. 13 (a) and (b) depict graphically state transitions involving token with decimal digit(s) according to one example of the invention. Referring to FIGS. 13 (a) and (b), the current state may be "1—possibly greater", "2—possibly small" or "3—possibly equal". if a decimal place indicator appears in the input number, the current digit from the target number is any one of 1, 2, 3, 4, 5, 6, 7, 8, 9, the next state moves to "5—Smaller" regardless of the current state; if a decimal place indicator appears in the target number, the current digit from the input number is any one of 1, 2, 3, 4, 5, 6, 7, 8, 9, the next state moves to "4—Greater" regardless of the current state. If a space character appears in one of the input number and the target number, and a decimal place indicator appears in the other one, the next state moves to a corresponding final/intermediate state of the current state, i.e. if the current state is "1—possibly greater", the next state is "4—Greater"; if current state is "2—possibly small", the next state is "5—Smaller", if current state is "3—possibly equal", the next state is "7-Possibly equal with decimal point" and the reader of the number in which the space character appears is moved back by one position.

Handling of + or − Symbols at the Beginning of Input or Target Numbers

Figure 14:
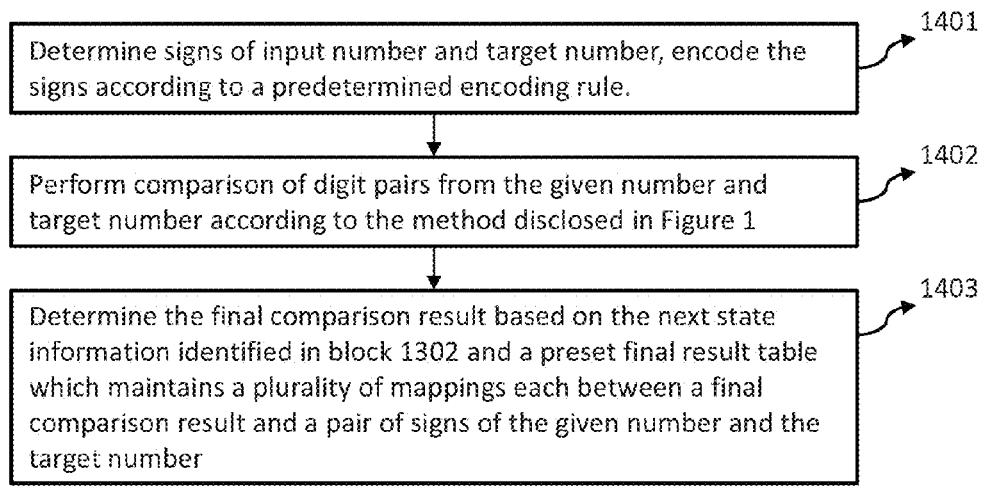
FIG. 14 (a) shows a process when handling comparison of the input number and the target number having "+" or "−" symbol/sign at the beginning of the numbers according to one embodiment of the invention.

Steps for sign handling are illustrated in FIG. 14 (a).

In block 1401, the state machine determines signs of the given number and the target number and encodes the signs according to a predetermined rule. For example, a negative sign is encoded as "0" and a positive sign is encoded as "1".

In block 1402, the state machine performs comparison of digit pairs from the given number and target number according to the method disclosed in FIG. 1.

In block 1403, the state machine determines the final comparison result based on the next state information identified in block 1302 and a preset final result table which maintains a plurality of mappings each between a final comparison result and a pair of signs of the given number and the target number.

FIG. 14(*b*) shows an example of the preset final result table. According to this preset final result table, if both the sign of the given number and the sign of the target number are positive signs, the final comparison result is same as the next state information identified in block 1302; if both the sign of the given number and the sign of the target number are negative signs, the final comparison result is contrary to the next state information identified in block 1302; if the sign of the non-zero given number is negative, the sign of the target number is positive, the final comparison result is "Smaller"; if the sign of the given number is positive, the sign of the non-zero target number is negative, the final comparison result is "Greater".

Experimental Results

In one embodiment of the invention, the method for number comparison may be used to check whether a given telephone number is same as a target telephone number. In order to determine whether the given telephone number is same as the target telephone number, the method may further comprise the following:

if the next state information identified based on the current digit pair is not "equal" or "possibly equal", determining, by the state machine, that the given telephone number is not same as the target telephone number, and if the final comparison result is that the given telephone number is same as the target telephone number, retrieving, by the state machine, a corresponding operator name from a predetermined position in the text file.

In one example of the embodiment, the method of comparison is used to check whether a given telephone number lies between two other numbers which are mentioned in ASCII format in a text file. The two numbers are in ranges of position 5 to 24 and 25 to 44 in each line of the text file. The comparison is made for ranges as mentioned in each line of the text file sequentially. If a match is found in a line, then operator identifier is extracted from a corresponding record from position 93 to 99 in the line. Also, in such case, rest of the ranges in the text file is not checked. If a match is not found, then all the ranges in the text file are checked. The text file has 49 lines in increasing order.

First and last lines are provided below to provide clarity.

```
  02RN0102010000        0102010009        0102010000    010 V
3020071119112750PTT  PTT   91024B325B325RT-C    A     RT-C A
001000001000ABCD-XYZT.B325      024D MI
  . . .
  . . .
  . . .
  02RN0102010940        0102010949        0102010944    010 V
3020030702190000XYZ1 PTT   91024B325B325RT-C    A     RT-C A
001000001000ABCD-XYZT.B325      024D MI
```

In the table shown in FIG. 15, time taken by the proposed method is contrasted against "conversion to number" based method for the above mentioned search for 1 million times. The tests were performed on a commodity grade machine with single Intel Pentium® dual-core CPU 2.0 GHz memory having 2 GB RAM, running Microsoft Windows Vista and Java 1.6. "Conversion to number" based method is already implemented in Java as Integer.parseInt( ) and Double.parseDouble( ) and the same were used for comparison purpose. Different kinds of given numbers, varying in magnitude, digits after decimal point, leading zeroes, presence of sign character etc. as mentioned in the table shown in FIG. 15 have been attempted to ascertain average improvement of performance.

Figure 16:
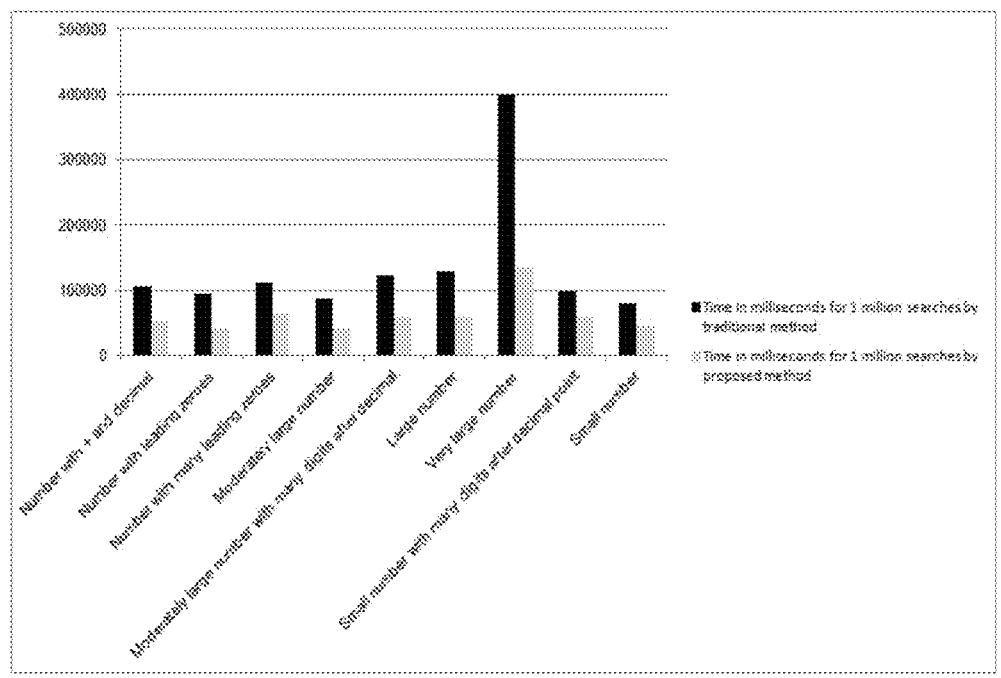
FIG. 16 is a bar chart showing the performance comparison of the proposed method for number comparison with a traditional method.

As apparent from the above, on the average, the proposed method reduces search time by half. FIG. 16 pictorially depicts performance comparison.

It is surprising that a method of comparing numbers can be implemented in a more efficient way than currently used. This has high importance where low latency computations are required or range check in mass scale is involved. The method disclosed in the embodiments of the invention can be applied to compare numbers with thousand separator or other separator characters, numbers with leading or trailing currency symbol, very large/small numbers and very high precision numbers. The advantages of the method disclosed in embodiments of the invention include but not limited to the following:

a) The method according to the invention is very fast. On the average (based on tests over numbers with varying number of digits before or after decimal place), the invention is 107% faster than traditional method.

b) The method according to the invention can compare two numbers directly even though the numbers are having thousand separators (e.g. comma) or leading $ etc. Traditional method will need removal of the corresponding characters before comparison which will take extra computation time.

c) Very large numbers—integers which can't be expressed in 4 bytes and floats which can't be expressed in 8 bytes following IEEE Standard 754, can't be compared using traditional method. Proposed invention has no limit on the size of number or number of places after decimal.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for comparing a given number and a target number during stream processing, the method comprising:

generating, by a state machine, a current index associated with the given number based on a current digit pair including a first current digit from the given number and a second current digit from the target number, and a current state information associated with the given number; and looking up, by the state machine, the generated current index in a preset state transition table to identify a next state information, wherein the preset state transition table maintains a plurality of mappings, each of the mappings is between an index and a next state information;

if the current digit pair includes a last digit of the given number or a last digit of the target number, determining, by the state machine, a final comparison result based on the identified next state information; and if the current digit pair includes neither a last digit of the given number nor a last digit of the target number, taking on, by the state machine, the identified next state information as the current state information associated with the given number for comparison of a next digit pair.

2. The method according to claim 1, wherein each index in the preset state transition table includes 12 bits, wherein 4 of the 12 bits are used for defining the current state information associated with the given number, 4 of the 12 bits are used for defining the first current digit from the given number, 4 of the 12 bits are used for defining the second current digit from the target number;

wherein generating a current index associated with the given number includes generating a 12 bits index having a same format as the index in the preset state transition table.

3. The method according to claim 2, wherein the current state information in each index is selected from 8 predetermined state types including: one Initial state, four intermediate state types including: "possibly greater", "possibly smaller", "possibly equal", "possibly equal with decimal place indicator", and three final state types including: "greater", "smaller" and "equal".

4. The method according to claim 3, wherein either of the first current digit and the second current digit is any one of 13 predetermined digits including: 0, 1, 2, 3, 4, 5, 6, 7, 8, 9, A which defines a decimal place indicator, E which defines a thousand separator, and F which defines a space character.

5. The method according to claim 3, wherein each next state information corresponding to an index in the preset state transition table includes 8 bits wherein 4 of the 8 bits are used for defining a next state value corresponding to the index, 1 of the 8 bits is used for indicating whether a reader of the first current digit from the given number should be moved back by one position, and 1 of the 8 bits is used for indicating whether a reader of the second current digit from the target number should be moved back by one position.

6. The method according to claim 5, further comprising: generating the preset state transition table.

7. The method according to claim 6, wherein the generating the preset state transition table includes:

if the current state information defined in the index is Initial state, and any one of the first current digit from given number and the second current digit from the target number is 0, setting a corresponding next state information in the preset state transition table to include a state value defining the Initial state and an indicator defining the reader of the number in which 0 appears will be moved back by one position.

8. The method according to claim 6, wherein the generating the preset state transition table includes:

if the first current digit from the given number and/or the second current digit from the target number is a comma, or other thousand separator, setting a corresponding next state information to include a state value defining a state same as the current state information defined in the index and an indicator defining the reader of the number in which the comma or other thousand separator appears will be moved back by one position.

9. The method according to claim 6, wherein the generating the preset state transition table includes:

if the first current digit from the given number is a decimal place indicator, the second current digit from the target number is any one of 1, 2, 3, 4, 5, 6, 7, 8, 9, setting a corresponding next state information to include a state value defining the "smaller" state regardless of the current state information defined in the index;

if the second current digit from the target number is a decimal place indicator, the first current digit from the given number is any one of 1, 2, 3, 4, 5, 6, 7, 8, 9, setting a corresponding next state information to include a value defining the "greater" state regardless of the current state information defined in the index;

if one of the first current digit from the given number and the second current digit from the target number is a space character, and the other one of the first current digit and the second current digit is a decimal place indicator, setting a corresponding next state to include a state value defining a corresponding final/intermediate state of the current state information defined by the index, and an indicator defining the reader of the number in which the space character appears will be moved back by one position.

10. The method according to claim 9, wherein if the current state information is "possibly greater", setting the corresponding next state to include a state value defining a corresponding final state "greater", if the current state information is "possibly smaller", setting the corresponding next state information to include a state value defining a corresponding final state "smaller", if the current state information is "possibly equal", setting the corresponding next state information to include a state value defining a state "possibly equal with decimal place indicator".

11. The method according to claim 1, further comprising:

if the given number and the target number includes negative or positive signs, determining the final comparison result based on a preset final result table which maintains a plurality of mappings each between a final comparison result and a pair of signs of the given number and the target number.

12. The method according to claim 1, wherein the given number is a given telephone number, the target number is a target telephone number stored in a text file, in order to determine whether the given telephone number is same as the target telephone number, the method further comprising:

if the next state information identified based on the current digit pair is not "equal" or "possibly equal", determining, by the state machine, that the given telephone number is not same as the target telephone number, and if the final comparison result is that the given telephone number is same as the target telephone number, retrieving, by the state machine, a corresponding operator name from a predetermined position in the text file.

13. A system for comparing a given number and a target number during stream processing, the system comprising: a processor and a memory communicably coupled thereto, wherein the memory is configured to store at least a preset state transition table to be executed by the processor, wherein the processor is configured to generate a current index associated with the given number based on a current digit pair including a first current digit from the given number and a second current digit from the target number, and a current state information associated with the given number; and look up the generated current index in a preset state transition table to identify a next state information, wherein the preset state transition table maintains a plurality of mappings, each of the mappings is between an index and a next state information;

if the current digit pair includes a last digit of the given number or a last digit of the target number, determine a final comparison result based on the identified next state information; and if the current digit pair includes neither a last digit of the given number nor a last digit of the target number, take on the identified next state information as the current state information associated with the given number for comparison of a next digit pair.

14. The system according to claim 13, wherein each index in the preset state transition table includes 12 bits, wherein 4 of the 12 bits are used for defining the current state information associated with the given number, 4 of the 12 bits are used for defining the first current digit from the given number, 4 of the 12 bits are used for defining the second current digit from the target number;

wherein the processor is further configured to generate a 12 bits index having a same format as the index in the preset state transition table.

15. The system according to claim 14, wherein the processor is further configured to generate the current index based on a current state information selected from 8 predetermined state types including: one Initial state, four intermediate state types including: "possibly greater", "possibly smaller", "possibly equal", "possibly equal with decimal place indicator", and three final state types including: "greater", "smaller" and "equal".

16. The system according to claim 15, wherein each next state information corresponding to an index in the preset state transition table includes 8 bits wherein 4 of the 8 bits are used for defining a next state value corresponding to the index, 1 of the 8 bits is used for indicating whether a reader of the first current digit from the given number should be moved back by one position, and 1 of the 8 bits is used for indicating whether a reader of the second current digit from the target number should be moved back by one position.

17. The system according to claim 16, wherein the processor is further configured to:
generate the preset state transition table.

18. The system according to claim 17, wherein the processor is further configured to if the current state information defined in the index is Initial state, and any one of the first current digit from given number and the second current digit from the target number is 0, set a corresponding next state information in the preset state transition table to include a state value defining the Initial state and an indicator defining the reader of the number in which 0 appears will be moved back by one position.

19. The system according to claim 17, wherein the processor is further configured to if the first current digit from the given number and/or the second current digit from the target number is a comma, or other thousand separator, set a corresponding next state information to include a state value defining a state same as the current state information defined in the index and an indicator defining the reader of the number in which the comma or other thousand separator appears will be moved back by one position.

20. The system according to claim 17, wherein the processor is further configured to
if the first current digit from the given number is a decimal place indicator, the second current digit from the target number is any one of 1, 2, 3, 4, 5, 6, 7, 8, 9, set the corresponding next state information to include a state value defining the "smaller" state regardless of the current state information defined in the index;
if the second current digit from the target number is a decimal place indicator, the first current digit from the given number is any one of 1, 2, 3, 4, 5, 6, 7, 8, 9, set the corresponding next state information to include a value defining the "greater" state regardless of the current state information defined in the index;
if one of the first current digit from the given number and the second current digit from the target number is a space character, and the other one of the first current digit and the second current digit is a decimal place indicator, set the corresponding next state to include a state value defining a corresponding final/intermediate state of the current state information defined by the index, and an indicator defining the reader of the number in which the space character appears will be moved back by one position.

21. The system according to claim 20, wherein the processor is further configured to
if the current state information is "possibly greater", set the corresponding next state to include a state value defining a corresponding final state "greater",
if the current state information is "possibly smaller", set the corresponding next state information to include a state value defining a corresponding final state "smaller",
if the current state information is "possibly equal", set the corresponding next state information to include a state value defining a state "possibly equal with decimal place indicator".

22. The system according to claim 13, the processor is further configured to
if the given number and the target number includes negative or positive signs, determine the final comparison result based on a preset final result table which maintains a plurality of mappings each between a final comparison result and a pair of signs of the given number and the target number.

23. The system according to claim 13, wherein the given number is a given telephone number, the target number is a target telephone number stored in a text file,
in order to determine whether the given telephone number is same as the target telephone number, the processor is further configured to
if the next state information identified based on the current digit pair is not "equal" or "possibly equal", determine that the given telephone number is not same as the target telephone number, and
if the final comparison result is that the given telephone number is same as the target telephone number, retrieve a corresponding operator name from a predetermined position in the text file.

* * * * *